Figures 1, 2, 3:
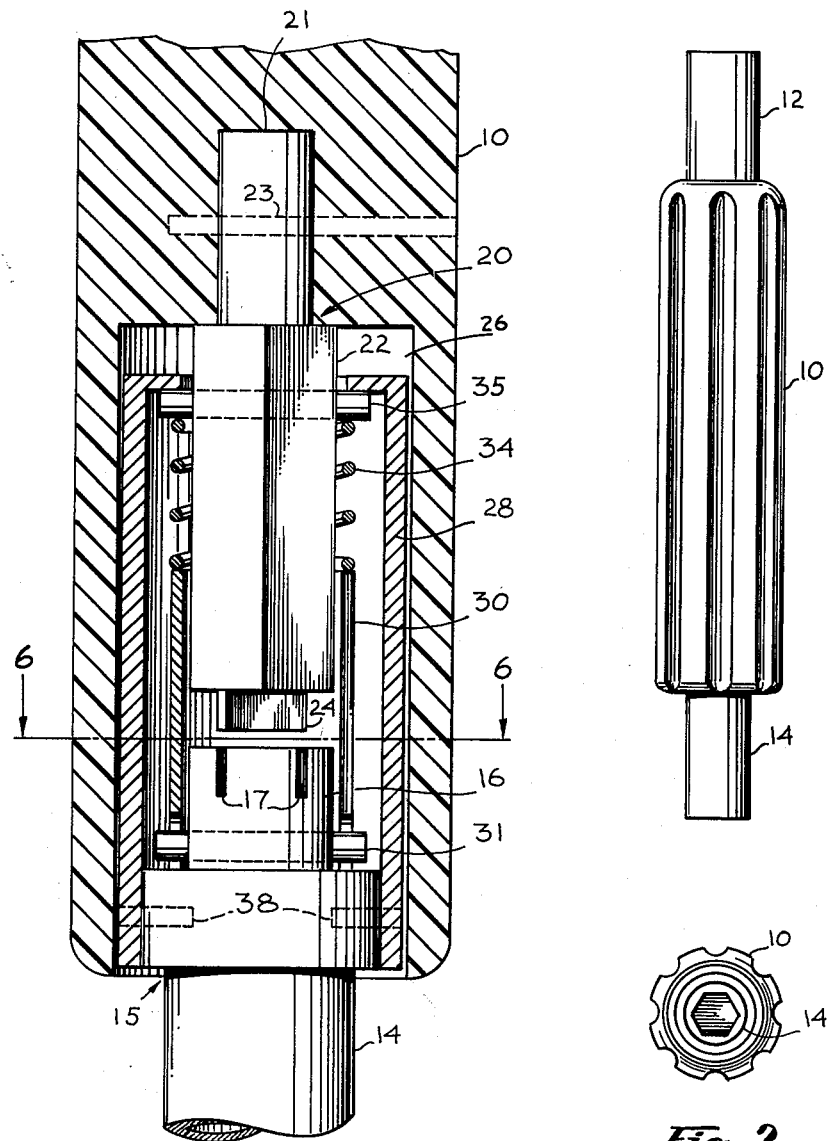

Nov. 17, 1964  F. P. CRONHOLM  3,157,258
TORQUE LIMITING COUPLING AND POSITIVE CLUTCH MECHANISM
Filed June 16, 1961  2 Sheets-Sheet 1

FREDERICK P. CRONHOLM
INVENTOR.

BY
Fraser and Bogucki
ATTORNEYS

Nov. 17, 1964    F. P. CRONHOLM    3,157,258
TORQUE LIMITING COUPLING AND POSITIVE CLUTCH MECHANISM
Filed June 16, 1961    2 Sheets-Sheet 2

FREDERICK P. CRONHOLM
INVENTOR.

BY Fraser and Bogucki
ATTORNEYS 3,157,258
TORQUE LIMITING COUPLING AND POSITIVE
CLUTCH MECHANISM
Frederick P. Cronholm, 5919 Lorelei, Lakewood, Calif.,
assignor of one-half to Vincent G. Dreesman
Filed June 16, 1961, Ser. No. 117,634
8 Claims. (Cl. 192—48)

This invention relates to rotary driving tools and more particularly to such tools which release a drive coupling when a predetermined amount of torque is applied.

In the installation or fabrication of electrical equipment employing a plurality of terminal members to which wires having terminal lugs may be connected, it is customary to employ threaded brass machine screw bodies of relatively small diameter for the respective terminals. Suitable electrical connections are made by placing a terminal lug over the threaded terminal member and securing it with a machine nut which is screwed down tight enough to provide a good electrical connection, at the same time achieving mechanical stability of the connection by the appropriate tightening of the nut. Electrical connections are also commonly established by tightening a machine screw into a terminal-board-mounted nut or other internally threaded assembly on which a terminal lug has been placed.

It is often the case that the installer or fabricator, in completing connections to the respective terminals, may overtighten one of the terminal members with the result that the terminal itself is destroyed, either by stripping the threads or by shearing off the threaded portion. As a result, material and time are wasted because of the necessary rewiring or substitution of an entire new terminal board.

It is, of course, possible in situations such as that outlined above to utilize a torque wrench of a type which indicates the torque being applied so that the operator may refrain from exerting more than a predetermined amount of driving torque. This is unfortunately wasteful of time, and such torque indicating wrenches are relatively cumbersome and are not suited to the rapid tightening of a plurality of threaded members. Various arrangements have been developed to provide wrenches capable of releasing the driving mechanism upon the application of some predetermined amount of torque. However, such mechanisms as are known have incorporated the use of rollers or bearings, catches and the like in arrangements which are too cumbersome to be readily adaptable in wrenches which are to be employed for the purposes described.

It is therefore a general object of the invention to provide an improved arrangement of a torque limiting mechanism.

It is an object of the invention to provide a torque limiting mechanism suitable for use on relatively small threaded members.

It is a further object of the invention to provide a simplified torque limiting mechanism in a structure of a size which may readily be held in the hand or carried in a pocket. In particular, it is an object of the invention to provide a torque limiting wrench in a structural arrangement having a size comparable to that of the ordinary hand-held socket wrench.

In brief, the present invention incorporates a torque coupling comprising a driving member and a driven member having mating shapes and juxtaposed in position to maintain a mechanical connection between the two. In accordance with the invention, one of the members is constructed of a resilient spring-like material in a form suitable for enclosing the other member. In one exemplary arrangement of the invention in the form of a socket wrench, the driving member of the torque coupling comprises an hexagonal or six-sided rod affixed to the wrench handle in a manner to prevent rotation with respect to the handle. The driven member is coupled to the driving member by a hollow spring arranged as a hexagonal sleeve to grip the flat sides of the driving member. This spring has a slot along its length which permits the spring to be forced open as the hexagonal driving member is rotated therein. The spring is affixed to the shaft of the wrench which may be adapted to transmit torque to the nut, bolt, screw or other element which is being rotated.

As torque is applied to the handle of the wrench embodying the present invention, a force is applied through the torque coupling to the element being rotated. This torque is transmitted without slippage so long as the driven element rotates relatively freely. When the element is tightened to a point where the transmitted torque exceeds a predetermined value, however, the hexagonal driving member tends to rotate slightly within the hollow spring of the driven member. As this rotation occurs, the opposite sides of the spring are forced apart, due to the greater distance across the corners of the hexagon than the distance between the opposing flat sides. Eventually the opposite sides of the spring driven member are forced sufficiently far apart to permit the opposite corners of the hexagon to pass the opposite sides of the spring. The torque which is required to force the spring of the driven member open to this point determines the maximum torque which may be transmitted from the driving member to the driven member. Thus, when the particular element (nut, bolt, screw or the like) which the wrench is turning is tightened to a position corresponding to the application of a predetermined amount of torque, the spring of the driven member is forced apart to permit a rotation of the driving member with respect thereto, thus limiting the torque which may be applied from the handle of the wrench to the element being rotated.

For a given material and configuration of the torque coupling assembly, the limiting amount of torque which may be transmitted is controlled by the thickness of the spring. Thus in accordance with the invention, the torque limiting mechanism may be readily designed to provide any desired maximum amount of transmitted torque.

Since the operation of the torque coupling assembly is the same in either direction so long as a symmetrical driving member is employed, it will be clear that the arrangement of the invention provides an equal torque limit for rotation in either direction. Because of the particular structure embodying the invention, the entire arrangement is of such a shape and size as to be readily mountable within a hollow handle which may fit the palm of the hand when gripped. Accordingly, the invention advantageously permits the fabrication of a torque limiting tool which is as simple to use and carry as the regular wrenches ordinarily employed without the torque limiting features.

Although the described exemplary arrangement of the invention provides a release of the mechanically attached members upon the application of a driving torque in excess of some predetermined amount, there is further provided in accordance with an aspect of the invention an arrangement for fixedly engaging the driven and driving members so that relative rotation between the two members is prevented, even though an excesssive amount of torque be applied. This is accomplished by providing on one portion of the driven member a plurality of blade-shaped slots and on a mating portion of the driving member a blade which may be moved into position to engage one of the slots. Engagement between the two members is ordinarily prevented by a spiral spring which exerts a force tending to hold the members sufficiently apart so that the blade of the driving member does not engage the slots of the driven member. In this position relative rotation between the two members is permissible upon the application of driving torque in excess of the amount which the torque coupling is designed to transmit. If, however, it is desired to transmit a greater amount of torque, the handle of the tool is simply pushed in the direction of the driven member, thus compressing the spiral spring and moving the blade portion of the driving member into engagement with one of the slots in the driven member. In accordance with an aspect of the invention, the number of slots provided is made equal to the number of positions in which the torque limiting spring may engage the driving member. Thus, in the case of a hexagonal driving member with a blade portion centrally disposed across one end thereof, the driven member is arranged to have three slots arranged in the positions of diameters of a circle and symmetrically spaced with respect to each other. As a result, no matter what the position of the torque limiting spring and the hexagonal driving member, the blade portion may be made to engage one of the blade-shaped slots simply by pushing the handle to compress the spiral spring and move the blade toward the slots.

While the exemplary arrangement of the invention shown and described herein comprises a driving member having an hexagonal cross section, it will be understood that the invention is not limited thereto. The shape of the driving member can be any shape which presents a greater dimension in one direction than in the other. Thus the driving member may comprise a square section, a rectangular section, an oval section or any shape which has different diagonal or diametrical dimensions in cross section. The inner dimension of the torque coupling spring is arranged to match the lesser dimension of the driving member so that the spring is forced apart as sufficient torque is applied to cause relative rotation between the driving and driven members.

While one particular arrangement of the invention utilizes a torque coupling spring which has a cross-sectional configuration matching that of the driving member, it is not necessary that this be the case. In fact, it has been found that improved performance with greater distribution of stress over the extent of the torque coupling spring may be attained by fabricating the spring in a configuration which is substantially U-shaped in cross section. In this arrangement the opposing flat sides of the U engage corresponding sides of the driving member but the entire oval portion of the U is available to distribute the spring forces rather than having a sharp angled point or line tending to concentrate the stress thereat. A stronger and more durable spring structure is thus provided for the torque limiting mechanism of the invention.

Figure 4:
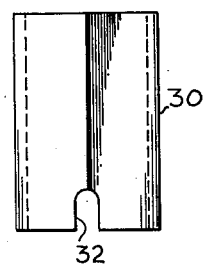
Figure 5A:
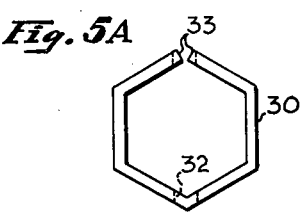
Figure 5B:
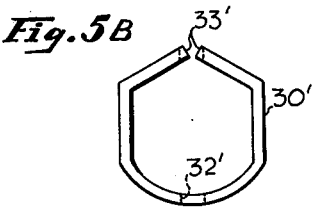
Figure 7A:
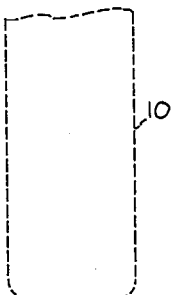
Figure 7B:
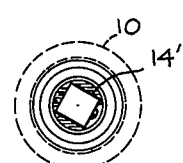
Figure 6:
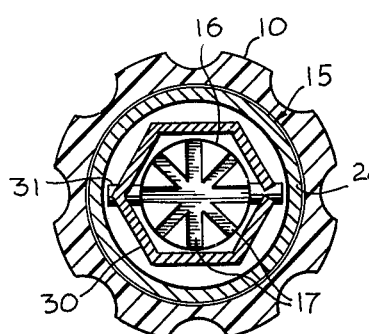
Figure 9:
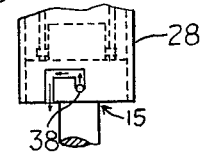
Figure 8:
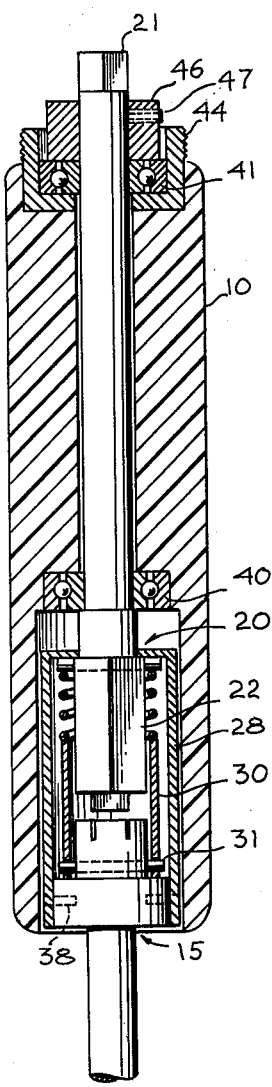

A better understanding of the invention may be gained from a consideration of the following detailed description taken in conjunction with the drawings wherein like reference numerals have been employed to designate like elements and in which:

FIG. 1 is a side view of an embodiment of the invention;
FIG. 2 is an end view of the arrangement of FIG. 1;
FIG. 3 is a sectional view of a portion of the arrangement of FIG. 1;
FIG. 4 is a side view of a particular part shown in cross section in FIG. 3;
FIG. 5A is an end view of the part shown in FIG. 4;
FIG. 5B is an end view of an alternative configuration for the part shown in FIG. 4;
FIG. 6 is a view taken along the section line 6—6 of FIG. 3 and looking in the direction of the arrows;
FIGS. 7A and 7B are side and end views respectively of an alternative arrangement of the invention;
FIG. 8 is a cross sectional view of yet another arrangement of the invention; and
FIG. 9 is a view of a portion of the arrangement of FIG. 8.

In FIGS. 1 and 2, one particular arrangement of the invention is shown in the form of a hand held torque limiting tool having a handle 10 comprising a suitable plastic material having alternate ridges and grooves to permit the tool to be gripped more readily. In this particular arrangement one end of the tool comprises a hexagonal socket 12 of one preferred size which is fixedly mounted in the handle 10 and held by a pin (not shown). At the other end is a hexagonal socket 14 of another selected size which extends within the handle 10 and is coupled thereto by the torque coupling mechanism which is shown in greater detail in the sectional view of FIG. 3.

As viewed in FIG. 3 the torque coupling assembly of the invention is shown mounted within a hollow portion 26 of the tool handle 10 and comprises a driving member 20 secured to a driven member 15 by a hollow spring 30. The driving member 20 is shown having an extended longitudinal portion 22 at one end of which is a shaft 21 which is fastened to the handle 10 by a pin 23 and at the other end of which is a blade portion 24. The driven member 15 is shown comprising a shaft 14 which may be shaped as a socket for engaging a machine screw nut or the like or alternatively may be in the shape of a screwdriver blade or the driving member of a demountable socket as desired. At the opposite end of the driven member 15 is a central portion 16 having a plurality of slots 17 cut in the face of the portion 16 which is adjacent the extended longitudinal portion 22 of the driving member 20. A slot 17 is provided opposite the blade 24 of the driving member 20 for each position in which the two members 15 and 20 may be held. The slot 17 and the blade 24 are shaped so that they engage each other when the members 15 and 20 are pushed together.

Disposed between the members 15 and 20 is a hollow spring 30 which may be seen more clearly in FIGS. 4 and 5. The driven member 15 is prevented from rotating within the spring 30 by means of a pin 31 which is set within the member 15 and which engages a pair of openings 32 in the spring 30. As shown in FIGS. 4 and 5A, the spring 30 comprises a hollow member of hexagonal cross section appropriately shaped to encase the extended hexagonal section 22 of the driving member 20. The spring 30 is not a completely closed hexagon but contains a longitudinal slot at the point where the ends 33 of the spring steel sheet which is fabricated to form the hexagon meet. Thus, the spring 30 is arranged to grip the hexagonal extended portion 22 of the driving member 20 and prevent relative rotation between driving member 20 and driven member 15 under normal circumstances. However, the longitudinal slot between the ends 33 of the spring 30 permits the spring 30 to expand and open as torque is applied to the driving member 20 up to a predetermined maximum value. When the applied torque reaches this value, the spring 30 is opened sufficiently to permit the points of the hexagonal extended portion 22 of the driving member 20 to rotate therein, thus advancing the driving member 20 to the next position, or one-sixth of a revolution with respect to the driven member 15.

The assembly depicted in FIG. 3 is encased within a housing 28 which is attached to the driven member 15 by pins 38. Sufficient clearance is provided between the housing 28 and the inner walls of the hollow enclosure 26 to permit the housing 28 to rotate with the driven member 15. A pin 35 extending through the longitudinal portion 22 of the driving member 20 bears against a lip portion of the housing 28 to hold the assembly together while at the same time serving as a stop for a coil spring 34.

The spring 34 bears against the hollow hexagonal spring 30 and in doing so serves two purposes. It maintains the spring 30 in position against the collar of the driven member 15 so that the pin 31 serves to lock the spring 30 thereto. In addition, the spring 34 maintains the driving member 20 and the driven member 15 spaced apart longitudinally so that the blade 24 does not engage any of the slots 17. At the same time, the spring 34 and the arrangement of the torque limiting assembly permit the driving member 20 to be pushed toward the driven member 15 and cause the blade 24 to enter one of the slots 17. When in this compressed position, the engagement of the blade 24 within a slot 17 provides a positive driving coupling between the members 15 and 20 so that any amount of torque may be transmited from one to the other. However, when the two members 15 and 20 are in the released position as shown in FIG. 3, the torque which may be transmitted from the driving member 20 to the driven member 15 is limited by the action of the spring 30, as described above, to some predetermined value. This maximum amount of torque which may be transmitted by the torque coupling is controlled for any given spring material by the thickness of the material of the spring 30 and can be determined, as is known in the art, by a calculation of the cross-sectional area thereof.

An alternative configuration for the spring 30 is shown in FIG. 5B and designated 30'. The spring 30' is shaped to conform to the hexagonal cross section of the member 22 except at the midportion of the spring 30'. At this point which is opposite one of the corners of the hexagon of the member 22, the spring 30' is rounded in order to provide a better distribution of the stress encountered within the spring when the ends 33' are spread apart as the member 22 is rotated relative to the member 15. The configuration of the spring 30' shown in FIG. 5B may be described as a substantially U-shaped configuration, in view of the flat sides and the rounded bottom portion.

FIGS. 7 and 8 depict other particular arrangements in which the torque coupling mechanism of the invention may be employed. In FIGS. 7A and 7B, side and end views, respectively, of a portion of an arrangement in accordance with the invention, a shaft 14' having an end which is shaped to receive a demountable socket of a socket wrench is shown extending from the handle 10. In this arrangement the shaft 14' is part of the driven member 15 which is shown in FIG. 3.

FIG. 8 represents another particular arrangement of the invention disposed for use as a power wrench or driver providing a torque limiting coupling. In this arrangement the shaft 21 of the driving member 20 is shown extending throughout the handle 10 in which it is held by suitable bearings 40, 41. At the end of the handle 10 from which the shaft 21 extends, the handle 10 is provided with a threaded sheath coupling member 44 in order that the handle 10 may be connected mechanically to the housing of a flexible drive shaft (not shown). A set collar 46 is secured to the shaft 21 by a pin 47 to retain the shaft 21 in position. The extended end of the shaft 21 is shaped to engage a mating surface at the end of the flexible shaft. In this arrangement torque which is applied to the shaft 21 is transmitted through the torque coupling comprising the extended hexagonal portion 22 and the expandible spring 30 to the driven member 15. By use of the arrangement of FIG. 8, a drive motor may be coupled via a flexible drive shaft to the handle 10 and the shaft 21 so that the implement may be used to transmit a limited amount of torque from a rotary power source in order to speed the assembly of parts on an assembly line or the like without exceeding the torque which the respective threaded connections are capable of withstanding.

FIG. 9 is a view of a portion of the arrangement of FIG. 8 and shows how the torque limiting mechanism of the invention may be arranged to permit a quick change of parts in order that the torque coupling may be readily modified to provide a different selected limit of transmitted torque. The housing 28 of the torque coupling mechanism is provided with a pair of L-shaped slots (one of which is shown) for receiving and retaining the pins 38 of the driven member 15. With this arrangement, the driven member may be easily removed by rotating it a quarter turn while pushing it slightly into the handle 10, then releasing it. The spring 30 may then be changed, thus providing a different torque limit for the device, and the mechanism may then be reassembled by inserting the driven member 15 and rotating it a quarter turn to engage the pins 38 within the slots of the housing 28. Suitable clearance should be provided between the blade 24 and slots 17 to permit the pins 38 to traverse the slots of the housing 28. If desired, the blade 24 may be omitted entirely from the arrangement of FIG. 8.

Although there have been described above specific arrangements of a torque limiting tool in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. A torque limiting tool having a handle and a torque coupling encased within its handle and comprising a driving member fixedly attached to the handle and having an extended portion of polygonal cross section, a driven member extending from the handle and including a spring member fixedly attached to the driven member, the spring member being arranged to grip the polygonal extended portion of the driving member and having a slot extending along its length to permit the expansion of the spring so that the polygonal portion of the driving member may rotate relative to the spring member upon the application of excessive torque, and means within the handle adapted to lock the driving member and the driven member together to prevent relative rotation with respect to each other including mating surfaces enclosed by said spring on adjacent portions of the respective members and means for maintaining the mating surfaces out of engagement for one position of the tool.

2. A torque tool comprising in combination a handle which may be gripped in the hand and having a hollow portion therein, a torque coupling assembly positioned within the hollow portion and including a driving member fixedly attached to the handle, a driven member extending from the handle and having an outer end which is shaped to hold a demountable socket, a longitudinally extended portion of the driving member having a non-uniform cross section with one dimension greater than another, a hollow spring attached to the driving member and having a cross-sectional configuration arranged to match the cross-sectional configuration of the longitudinally extended portion, means positioning the spring about the longitudinally extended portion of the driving member, means including an open slot along the length of the spring member for permitting the spring member to expand and allow a relative rotation between the driving member and the driven member upon the application of torque in excess of a predetermined amount, and a mechanism for locking the driving and driven members together to prevent relative rotation therebetween comprising a blade attached to the driving member, a plurality of slots in the end of the driven member facing the blade and disposed to engage the blade when the driving and driven members are moved together, said blade and slots being enclosed within the hollow spring, and a second spring biasing the blade and the slots apart and interconnected to the handle, whereby sliding of the handle toward the driven member against the biasing action of the second spring releasably engages the blade in one of the slots.

3. A torque coupling assembly for a torque limiting mechanism comprising, in combination, a handle which may be gripped and having a hollow portion therein, a torque coupling assembly disposed within said handle and comprising a driven member and a driving member fixedly connected to the handle, one of said members being shaped to provide a cross section having a greater dimension in one direction than in another, a hollow sleeve of a resilient material coupled to the other of the said members and arranged to encase at least a segment of the shaped portion of said one member, the resilient sleeve being arranged to engage said segment at the point of its lesser cross-sectional dimension and adapted to transmit torque below a predetermined limit from the driving member to the driven member and adapted to be spread so as to permit relative rotation between the driving member and the driven member upon the application of torque in excess of said predetermined limit, and a mechanism for selectively locking the driving and driven members together to prevent relative rotation therebetween comprising a blade attached to one member, a plurality of slots in the end of the other member facing the blade and disposed to engage the blade when the driving and driven members are moved together, and a second spring biasing the blade and slots apart and interconnected to the handle, whereby movement of the handle toward the driven member against the biasing action of said second spring releasably engages the blade in one of the slots.

4. A torque coupling mechanism for a power driven tool comprising a handle, first and second shaft members positioned within the handle, the first shaft member extending from one end of the handle, the second shaft member extending from the opposite end of the handle and adapted to rotate in response to rotation of the first shaft member, a portion of the first shaft member being configured to present different dimensions in cross section, a resilient coupling means between the first and second shaft members arranged to grip the first shaft member at the lesser cross-sectional dimension of said portion thereof, means for causing the coupling means to rotate relative to the first shaft member upon the application thereto of torque in excess of a predetermined amount, a housing enclosing the coupling means within the handle and affixed to the second shaft member, and means for disengaging the second shaft member from the housing in order that the coupling means may be changed to vary the maximum limit of torque transmitted by the coupling means comprising a pair of pins embedded in the second shaft member and a pair of L-shaped slots positioned in the housing member for receiving the pins.

5. A torque limiting tool having a handle and a torque coupling encased within its handle and comprising a driving member fixedly attached to the handle and having an extended portion of polygonal cross section, a driven member extending from the handle and including a spring member fixedly attached to the driven member, the spring member being arranged to grip the polygonal extended portion of the driving member and having a slot extending along its length to permit the expansion of the spring so that the polygonal portion of the driving member may rotate relative to the spring member upon the application of excessive torque, and means within the handle adapted to lock the driving member and the driven member together to prevent relative rotation with respect to each other including mating surfaces enclosed by said spring on adjacent portions of the respective members and means for maintaining the mating surfaces out of engagement for one position of the tool, said spring member comprising a split tube of polygonal cross section encasing a segment of the polygonal extended portion of the driving member.

6. A torque limiting tool having a handle and a torque coupling encased within its handle and comprising a driving member fixedly attached to the handle and having an extended portion of polygonal cross section, a driven member extending from the handle and including a spring member fixedly attached to the driven member, the spring member being arranged to grip the polygonal extended portion of the driving member and having a slot extending along its length to permit the expansion of the spring so that the polygonal portion of the driving member may rotate relative to the spring member upon the application of excessive torque, and means within the handle adapted to lock the driving member and the driven member together to prevent relative rotation with respect to each other including mating surfaces enclosed by said spring on adjacent portions of the respective members and means for maintaining the mating surfaces out of engagement for one position of the tool, said spring member comprising a substantially U-shaped member encasing a segment of the polygonal extended portion of the driving member.

7. A torque coupling assembly for a torque limiting mechanism comprising, in combination, a handle which may be gripped and having a hollow portion therein, a torque coupling assembly disposed within said handle and comprising a driven member and a driving member, one of said members being shaped to provide a hexagonal cross section having a greater dimension in one direction than in another, a hollow sleeve of a resilient material coupled to the other of the said members and arranged to encase at least a segment of the shaped portion of said one member, the resilient sleeve being arranged to engage said segment at the point of its lesser cross-sectional dimension and adapted to transmit torque below a predetermined limit from the driving member to the driven member and adapted to be spread so as to permit relative between the driving member and the driven member upon the application of torque in excess of said predetermined limit, and a mechanism for selectively locking the driving and driven members together to prevent relative rotation therebetween comprising a blade attached to one member, a plurality of slots in the end of the other member facing the blade and disposed to engage the blade when the driving and driven members are moved together, and a second spring biasing the blades and slots apart and interconnected to the handle, whereby movement of the handle toward the driven member against the biasing action of said second spring releasably engages the blade in one of the slots.

8. A torque coupling mechanism for a power driven tool comprising a handle, first and second shaft members positioned within the handle, the first shaft member extending from one end of the handle, the second shaft member extending from the opposite end of the handle and adapted to rotate in response to rotation of the first shaft member, a portion of the first shaft member being configured to present different dimensions in cross section, a resilient coupling means between the first and second shaft members arranged to grip the first shaft member at the lesser cross-sectional dimension of said portion thereof, means for causing the coupling means to rotate relative to the first shaft member upon the application thereto of torque in excess of a predetermined amount, a housing enclosing the coupling means within the handle and affixed to the second shaft member, means for disengaging the second shaft member from the housing in order that the coupling means may be changed to vary the maximum limit of torque transmitted by the coupling means comprising a pair of pins embedded in the second shaft member and a pair of L-shaped slots positioned in the housing member for receiving the pins, and means for providing a positive torque coupling between the first and second shaft members including a blade shaped protrusion on the end of the first shaft member, a plurality of slots cut in the face of the second shaft member adjacent the blade shaped protrusion and disposed to receive said protrusion when the two shaft members are pushed together, and a spiral spring disposed in compression between the first and second shaft members for urging the two shaft members apart.

References Cited in the file of this patent
UNITED STATES PATENTS

| | | |
|---|---|---|
| 1,092,574 | Jansson | Apr. 7, 1914 |
| 2,396,040 | Darling | Mar. 5, 1946 |
| 2,768,547 | Noell | Oct. 30, 1956 |
| 2,826,903 | Gerstung et al. | Mar. 18, 1958 |
| 2,942,441 | Chapoux | June 28, 1960 |

UNITED STATES PATENT OFFICE
CERTIFICATE OF CORRECTION

Patent No. 3,157,258            November 17, 1964

Frederick F. Cronholm

It is hereby certified that error appears in the above numbered patent requiring correction and that the said Letters Patent should read as corrected below.

Column 5, line 9, for "transmited" read -- transmitted --; column 8, line 24, after "relative" insert -- rotation --.

Signed and sealed this 18th day of May 1965.

(SEAL)
Attest:

ERNEST W. SWIDER            EDWARD J. BRENNER
Attesting Officer            Commissioner of Patents